US011387717B2

(12) United States Patent
Jin et al.

(10) Patent No.: US 11,387,717 B2
(45) Date of Patent: Jul. 12, 2022

(54) SERIES WOUND DIRECT-CURRENT MOTOR DRIVING DEVICE AND EQUIPMENT

(71) Applicant: UNIVERSITY OF SHANGHAI FOR SCIENCE AND TECHNOLOGY, Shanghai (CN)

(72) Inventors: Aijuan Jin, Shanghai (CN); Shaolong Li, Shanghai (CN)

(73) Assignee: UNIVERSITY OF SHANGHAI FOR SCIENCE AND TECHNOLOGY, Shanghai (CN)

( * ) Notice: Subject to any disclaimer, the term of this patent is extended or adjusted under 35 U.S.C. 154(b) by 0 days.

(21) Appl. No.: 17/296,241

(22) PCT Filed: Dec. 27, 2019

(86) PCT No.: PCT/CN2019/129048
§ 371 (c)(1),
(2) Date: May 23, 2021

(87) PCT Pub. No.: WO2020/135682
PCT Pub. Date: Jul. 2, 2020

(65) Prior Publication Data
US 2022/0021281 A1  Jan. 20, 2022

(30) Foreign Application Priority Data

Dec. 29, 2018 (CN) .......................... 201811653540.4
Dec. 29, 2018 (CN) .......................... 201811654437.1
(Continued)

(51) Int. Cl.
H02K 1/14    (2006.01)
H02K 3/18    (2006.01)
(Continued)

(52) U.S. Cl.
CPC ............... *H02K 11/33* (2016.01); *H02K 1/14* (2013.01); *H02K 3/18* (2013.01); *H02K 23/08* (2013.01); *H02K 1/26* (2013.01); *H02K 5/225* (2013.01)

(58) Field of Classification Search
CPC .. H02K 1/14; H02K 1/26; H02K 3/18; H02K 11/33; H02K 11/38; H02K 23/08; H02P 7/298; H02P 7/2985
See application file for complete search history.

(56) References Cited

U.S. PATENT DOCUMENTS 527,776 A * 10/1894 Daniels .................. H02K 23/40
                                                    310/40 R
5,332,954 A *  7/1994 Lankin .................... B60L 50/52
                                                    318/139

FOREIGN PATENT DOCUMENTS

CN    101873097 A    10/2010
CN    104617835 A    5/2015
(Continued)

OTHER PUBLICATIONS

International Search Report in PCT/CN2019/129048, issued by ISA, dated Mar. 26, 2020.
(Continued)

*Primary Examiner* — Quyen P Leung
*Assistant Examiner* — Eric Johnson
(74) *Attorney, Agent, or Firm* — Zhu Lehnhoff LLP

(57) ABSTRACT

The invention provides a series wound DC motor driving device and electrical equipment. The series wound DC motor driving device provided by the invention comprises a series wound DC motor, a DC power supply and a chopper, wherein the chopper comprises m chopping units; control signals comprise m unit control signals formed according to preset phase stagger rules and corresponding to the m chopping units separately, and each unit control signal
(Continued)

comprises w switch control signals corresponding to w switch control ends in the corresponding chopping units; m pairs of power output terminals are formed at m first power output ends and m second power output ends of the chopping units correspondingly, and m pairs of external terminals of the series wound DC motor are connected with m pairs of power output terminals correspondingly one by one; m is a positive integer not smaller than 2, and w is 1, 2 or 4.

20 Claims, 13 Drawing Sheets

(30) Foreign Application Priority Data

| Dec. 29, 2018 | (CN) | 201811654447.5 |
| Dec. 29, 2018 | (CN) | 201811654465.3 |
| Dec. 29, 2018 | (CN) | 201811654529.X |
| Dec. 29, 2018 | (CN) | 201811654617.X |

(51) Int. Cl.
*H02K 11/33* (2016.01)
*H02K 23/08* (2006.01)
*H02K 1/26* (2006.01)
*H02K 5/22* (2006.01)

(56) References Cited

FOREIGN PATENT DOCUMENTS

| CN | 105207548 A | 12/2015 |
| CN | 106602947 A | 4/2017 |
| EP | 3229365 A1 | 10/2017 |

OTHER PUBLICATIONS

Written Opinion of the International Search Report in PCT/CN2019/129048, issued by ISA, dated Mar. 26, 2020.

* cited by examiner

SERIES WOUND DIRECT-CURRENT MOTOR DRIVING DEVICE AND EQUIPMENT

TECHNICAL FIELD

The invention belongs to the field of DC motors, and particularly relates to a series wound DC motor driving device and electrical equipment comprising the same.

BACKGROUND

The excitation winding and armature winding of a series wound DC motor are connected in series, and the torque of the motor is directly proportional to the square of current; the series wound DC motor has the advantages of high speed, large starting torque, small size, light weight, wide applicable voltage range and capability of regulating the speed by regulating the voltage, and is not prone to stall; the requirements for quick start, acceleration, climbing and frequent start/stop of an electric vehicle can be met, and thus the series wound DC motor has obvious advantages for driving heavy load vehicles, such as electric trucks, rail vehicles, sightseeing vehicles, wagons and ships.

As shown in FIG. 6, throughout hundreds of years of development history of the motors, a traditional series wound DC motor driving device 200 is composed of a series wound DC motor and a chopper; the series wound DC motor comprises only a pair of external terminals, which are electrically connected with a pair of power output terminals of the chopper correspondingly. The maximum output current of the chopper is generally 2-3 times the rated current of the motor in order to ensure the system reliability. The high-power and high-performance series wound DC motor, especially the low-voltage and high-current series wound DC motor, needs a chopper with a high continuous working current. However, the switching element in the relevant chopper is high in price, and the maximum output current of the chopper used by the high-performance motor that can be purchased on market is only below 1,000 amperes, which severely restricts and affects the development of the low-voltage high-current series wound DC motor.

The chopper adopts a pulse width modulation technology to control the power switch tube to switch on and off for changing the output voltage and current, and the size of output current ripples is directly proportional to that of output torque and speed ripples of the motor, and is inversely proportional to the switching frequency of the power switch tube, while the switching loss (or temperature rise and fault rate) of the power switch tube is directly proportional to the switching frequency of the power switch tube. Thus, the switching frequency must be improved in order to reduce the size of output current, torque and speed ripples of the motor; but the switching frequency of the power switch tube must be reduced in order to reduce the switching loss of the power switch tube. Such a contradictory relation affects the development of the series wound DC motor driving device. Accordingly, the power switch tube is hard to be applied to CNC machine tools and other devices with strict requirements for speed and torque ripples. For example, in the series wound DC motor applied to national defense equipment, the self-vibration and noise need to be reduced due to the potential requirements, that is to say, the requirements for output torque ripples and current ripples are especially high. At present, the traditional series wound DC motor applied to high-power national defense electrical equipment is difficult to cope with the increasingly advanced investigation technology.

For these reasons, the development of the series wound DC motor driving device is restricted and affected, and consequently the development of electrical equipment, such as electric vehicles, electric ships, electric aircrafts, even electric chariots, electric warships, electric aircrafts and electrically driven aircraft carriers, is affected; the economic construction and national defense construction are affected.

SUMMARY

The invention aims to solve the above problems, and provide a series wound DC motor driving device and electrical equipment comprising the same.

In order to achieve the above purposes, the invention adopts the following technical scheme:

<Structure I>

The invention provides a series wound DC motor driving device, characterized by comprising a series wound DC motor with a rated voltage, a DC power supply with a constant voltage corresponding to the rated voltage, and a chopper used for converting the constant voltage into a variable voltage based on control signals and providing the variable voltage to the series wound DC motor, wherein the chopper comprises m chopping units; each chopping unit comprises first power output ends and second power output ends and w switch control ends, and the control signals comprise m unit control signals formed according to the preset phase stagger rules and corresponding to the m chopping units separately; each unit control signal comprises w switch control signals corresponding to the w switch control ends in the corresponding chopping units; the w switch control ends are used for receiving the w switch control signals correspondingly; m pairs of power output terminals are formed at the m first power output ends and m second power output ends of the chopping units correspondingly; the series wound DC motor comprises m pairs of electrical brushes, a stator comprising m pairs of main magnetic poles corresponding to m pairs of electrical brushes and an excitation winding portion, and a rotor arranged in the stator and comprising a plurality of armature windings connected with each other in a preset connecting mode; each pair of main magnetic poles includes an S main magnetic pole and an N main magnetic pole, and the two adjacent main magnetic poles are different in polarity; the positions of two electrical brushes in each pair of electrical brushes are adjacent, and each pair of electrical brushes comprises an S-pole corresponding electrical brush corresponding to the S main magnetic pole, and an N-pole corresponding electrical brush corresponding to the N main magnetic pole; the excitation winding portion comprises m excitation winding units, and each excitation winding unit is formed by making insulated conductor strips composed of metal wires wrapped with insulating layers into excitation coils on at least one pair of main magnetic poles; each insulated conductor strip in each excitation winding unit includes one end and the other end, and the m ends of the insulated conductor strips are electrically connected with m S-pole corresponding electrical brushes among the electrical brushes to form m first terminals; meanwhile, the m other ends of the insulated conductor strips are electrically connected with m N-pole corresponding electrical brushes among the electrical brushes to form m second terminals; or, the m ends of the insulated conductor strips are electrically connected with m N-pole corresponding electrical brushes among the electrical brushes to form m first terminals; meanwhile, the m other ends of the insulated conductor strips are electrically connected with m S-pole corresponding electrical brushes among the electrical brushes to form m second terminals; the m first terminals and the m second terminals form m pairs of external terminals correspondingly, and m pairs of external terminals are connected with m pairs of power output terminals correspondingly one by one; m is a positive integer smaller than 2, and w is 1, 2, or 4.

The series wound DC motor driving device provided by the invention can be further characterized in that, wherein the w is 1, each chopping unit further comprises an upper bridge arm and a lower bridge arm which are connected with each other in series; the upper bridge arm is connected with a positive electrode of the DC power supply, and the lower bridge arm is connected with a negative electrode of the DC power supply; the upper bridge arm comprises at least one power switch tube and a switch control end, and each power switch tube comprises a control electrode; the switch control end is formed on the basis of the control electrode, and the lower bridge arm comprises at least one diode; the first power output end is arranged between the upper bridge arm and the lower bridge arm, and the second power output end is arranged at the end of the connection position between the lower bridge arm and the DC power supply.

The series wound DC motor driving device by the invention can be further characterized in that, wherein the preset phase stagger rules refer to that the phases of the m switch control signals are separately staggered in sequence for 1/m of the switching period; or the m is an even integer, and the preset phase stagger rules refer to that the phases of the m switch control signals are separately staggered in sequence for 2/m of the switching period.

The series wound DC motor driving device provided by the invention can be further characterized in that, wherein the w is 2, each chopping unit further comprises an upper bridge arm and a lower bridge arm which are connected with each other in series; the upper bridge arm is connected with the positive electrode of the DC power supply, and the lower bridge arm is connected with the negative electrode of the DC power supply; the upper bridge arm and the lower bridge arm each comprise at least one power switch tube, at least one diode connected with the power switch tube in parallel reversely, and the switch control end, and each power switch tube comprises a control electrode; the switch control end is formed on the basis of the control electrode; the switch control end in the upper bridge arm, as an upper bridge arm switch control end, and the switch control end in the lower bridge arm, as a lower bridge arm switch control end, are used for correspondingly receiving two switch control signals; the first power output end is arranged between the upper bridge arm and the lower bridge arm, and the second power output end is arranged at the end of the connection position between the lower bridge arm and the DC power supply.

The series wound DC motor driving device provided by the invention can be further characterized in that, wherein, in each chopping unit, the switch control signal corresponding to the upper bridge arm switch control end is set as a reference switch control signal, and the phase of the reference switch control signal is set according to the preset phase corresponding to the unit control signal; the switch control signal corresponding to the lower bridge arm switch control end is set oppositely to the reference switch control signal, and the preset phase stagger rules refer to that the m phases corresponding to the m unit control signals are used as m preset phases staggered in sequence for 1/m of the switching period; or the m is an even integer, and the preset phase stagger rules refer to that the m phases corresponding to the m unit control signals are used as m preset phases staggered in sequence for 2/m of the switching period.

The series wound DC motor driving device provided by the invention can be further characterized in that, wherein the w is 4, each chopping unit further comprises a first bridge arm and a second bridge arm which are connected with each other in parallel; the first bridge arm comprises a first upper bridge arm and a first lower bridge arm which are connected with each other in series, and the second bridge arm comprises a second upper bridge arm and a second lower bridge arm which are connected with each other in series; the first upper bridge arm and the second upper bridge arm are both connected with the positive electrode of the DC power supply, and the first lower bridge arm and the second bridge arm are both connected with the negative electrode of the DC power supply; the first upper bridge arm, the first lower bridge arm, the second upper bridge arm and the second lower bridge arm each comprise at least one power switch tube, at least one diode connected with the power switch tube in parallel reversely, and the switch control end; each power switch tube comprises a control electrode, and the switch control end is formed on the basis of the control electrode; the switch control end in the first upper bridge arm, as a first upper bridge arm switch control end, the switch control end in the first lower bridge arm, as a first lower bridge arm switch control end, the switch control end in the second upper bridge arm, as a second upper bridge arm switch control end, and the switch control end in the second lower bridge arm, as a second lower bridge arm switch control end, are used for correspondingly receiving four switch control signals; the first power output end is arranged between the first upper bridge arm and the first lower bridge arm, and the second power output end is arranged between the second upper bridge arm and the second lower bridge arm.

The series wound DC motor driving device provided by the invention can be further characterized in that, wherein, in each chopping unit, the two switch control signal corresponding to the first upper bridge arm switch control end and the second lower bridge arm switch control end are set as reference switch control signals, and the phases of the reference switch control signals are set according to the preset phases corresponding to the unit control signals; the two switch control signals corresponding to the first lower bridge arm switch control end and the second upper bridge arm switch control end are set oppositely to the reference switch control signals, and the preset phase stagger rules refer to that the m phases corresponding to the m unit control signals are used as m preset phases staggered in sequence for 1/m of the switching period; or the m is an even integer, and the preset phase stagger rules refer to that the m phases corresponding to the m unit control signals are used as m preset phases staggered in sequence for 2/m of the switching period.

The series wound DC motor driving device provided by the invention can be further characterized in that, wherein the m excitation winding units correspond to m pairs of main magnetic poles separately, and the insulated conductor strips in each excitation winding unit are formed on a pair of corresponding main magnetic poles.

The series wound DC motor driving device provided by the invention can be further characterized in that, wherein the numbers of turns of the excitation coils on each main magnetic pole are the same, and each pair of main magnetic poles corresponds to the spatial position of the corresponding electrical brushes; the connection relation between the two excitation coils in each excitation winding unit is series connection or parallel connection, and the connection relation between the two excitation coils in each excitation winding unit is the same.

The series wound DC motor driving device provided by the invention can be further characterized in that, wherein the insulated conductor strips in each excitation winding unit are formed on a pair of corresponding main magnetic poles.

The series wound DC motor driving device provided by the invention can be further characterized in that, wherein the winding directions and numbers of turns of the excitation coils on each main magnetic pole are the same; the connection relation among 2m excitation coils in each excitation winding unit is any one of series connection, parallel connection and series-parallel connection, and the connection relations among 2m excitation coils in each excitation winding unit are the same.

The series wound DC motor driving device provided by the invention can be further characterized in that, wherein the preset connecting mode is any one of simplex lap, multiplex lap and multiplex wave.

<Structure II>

The invention further provides electrical equipment, characterized by comprising the series wound DC motor driving device, wherein the series wound DC motor driving device is the series wound DC motor driving device of <Structure I>.

The electrical equipment provided by the invention can be further characterized in that, wherein the electrical equipment is any one of a rolling mill, an electric locomotive, a machine main shaft transmission system and a ship.

Functions and Effect

According to the series wound DC motor driving device and electrical equipment comprising the same involved in the invention, the chopper comprises m chopping units; each chopping unit comprises first power output ends and second power output ends and w switch control ends, and the control signals comprise m unit control signals formed according to the preset phase stagger rules and corresponding to the m chopping units separately; each unit control signal comprises w switch control signals corresponding to the w switch control ends in the corresponding chopping units; the w switch control ends are used for receiving the w switch control signals correspondingly; m pairs of power output terminals are formed at the m first power output ends and m second power output ends of the chopping units correspondingly; the series wound DC motor comprises a casing, m pairs of electrical brushes fixed in the casing, a stator comprising m pairs of main magnetic poles corresponding to m pairs of electrical brushes and an excitation winding portion, and a rotor arranged in the stator and comprising a plurality of armature windings connected with each other in a preset connecting mode; each pair of main magnetic poles includes an S main magnetic pole and an N main magnetic pole, and the two adjacent main magnetic poles are different in polarity; the positions of two electrical brushes in each pair of electrical brushes are adjacent, and each pair of electrical brushes comprises an S-pole corresponding electrical brush corresponding to the S main magnetic pole, and an N-pole corresponding electrical brush corresponding to the N main magnetic pole; the excitation winding portion comprises m excitation winding units, and each excitation winding unit is formed by making insulated conductor strips composed of metal wires wrapped with insulating layers into excitation coils on at least one pair of main magnetic poles; each insulated conductor strip in each excitation winding unit includes one end and the other end, and the m ends of the insulated conductor strips are electrically connected with m S-pole corresponding electrical brushes among the electrical brushes to form m first terminals; meanwhile, the m other ends of the insulated conductor strips are electrically connected with m N-pole corresponding electrical brushes among the electrical brushes to form m second terminals; or, the m ends of the insulated conductor strips are electrically connected with m N-pole corresponding electrical brushes among the electrical brushes to form m first terminals; meanwhile, the m other ends of the insulated conductor strips are electrically connected with m S-pole corresponding electrical brushes among the electrical brushes to form m second terminals; the m first terminals and the m second terminals form m pairs of external terminals correspondingly, and m pairs of external terminals are connected with m pairs of power output terminals correspondingly one by one; m is a positive integer smaller than 2, and w is 1, 2, or 4, that is to say, each pair of external terminals is connected with an excitation winding unit and a pair of electrical brushes, and the excitation winding unit and the electrical brushes are connected in series; thus, on one hand, each excitation winding unit and a branch circuit composed of a pair of electrical brushes connected correspondingly are independent, and the current of each branch circuit is also independent; each branch circuit can work independently, and is powered on by a pair of corresponding power output terminals independently, that is, each pair of power output terminals only bears the working current of one branch circuit, and the working current accounts for 1/m of the rated current of the motor; thus, even for the motor with a high rated current, as long as m is large enough, the working current of each branch circuit or the output current for each pair of power output terminals can be reduced correspondingly; the output current of the power output terminal can be reduced to the extent that the requirements of the high-power and high-performance motor can be met without adopting a parallel balanced current technology but using a common power switch tube or a power module; not only is the cost reduced, but also the requirements of a connecting wire and a connecting piece between the external terminal and the power output terminal for contact resistance and insulation are reduced; the difficulty in manufacturing is reduced, and the improvement of the system reliability and safety is benefited.

On the other hand, the control signals comprise m unit control signals formed according to the preset phase stagger rules and corresponding to the m chopping units separately, so that the current ripple phases of each pair of power output terminals are different; thus, the peak-to-peak value of ripples after superposition of m current ripples is reduced, so that the peak-to-peak values of output torque and speed ripples are reduced, and the performance and life of the series wound DC motor are improved.

Moreover, in case the electrical brushes in the motor, the excitation winding unit and the connecting wire malfunction, only the part where the fault is located is shielded, and other normal parts can still work; the phenomenon that a traditional series wound DC motor is out of control suddenly, and the system reliability and safety are improved.

In conclusion, the series wound DC motor driving device of the invention has the advantages of simple structure, short connecting wire, simple production process, easy manufacturing, convenient maintenance, low production cost and maintenance cost, rational and simple design, high reliability and safety, etc., so that the series wound DC motor driving device not only can be applied to high load electrical equipment, such as electric vehicles, electric trucks, rail vehicles, sightseeing vehicles, wagons and ships, but also can be applied to high-performance electrical equipment, such as CNC machine tools and submarines.

DETAILED DESCRIPTION OF THE EMBODIMENTS

The following is a detailed description of the embodiments of the invention in combination with drawings.

Embodiment I

Figure 1:
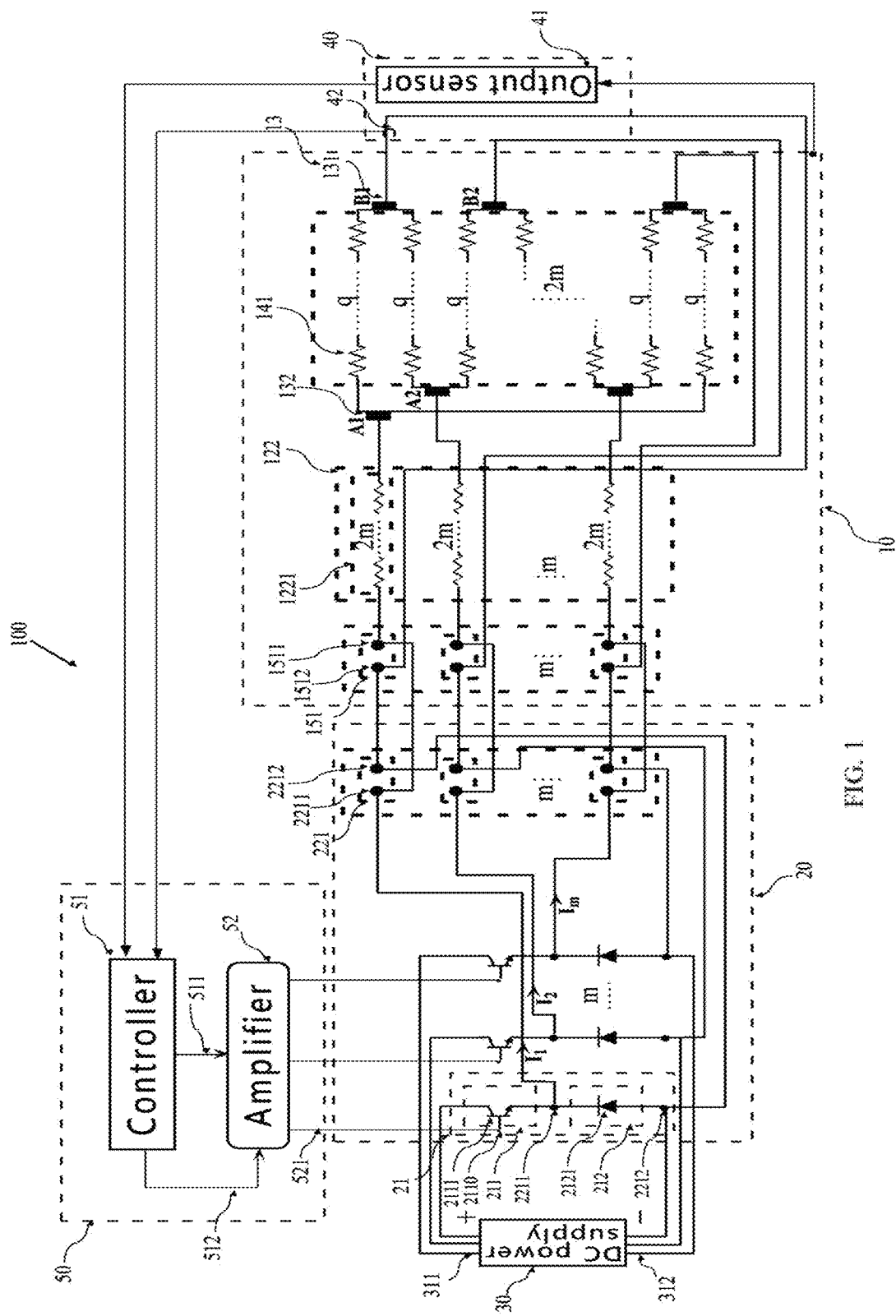
FIG. 1 is a circuit connection diagram of a series wound DC motor driving device in the embodiment I of the invention.
Figure 2:
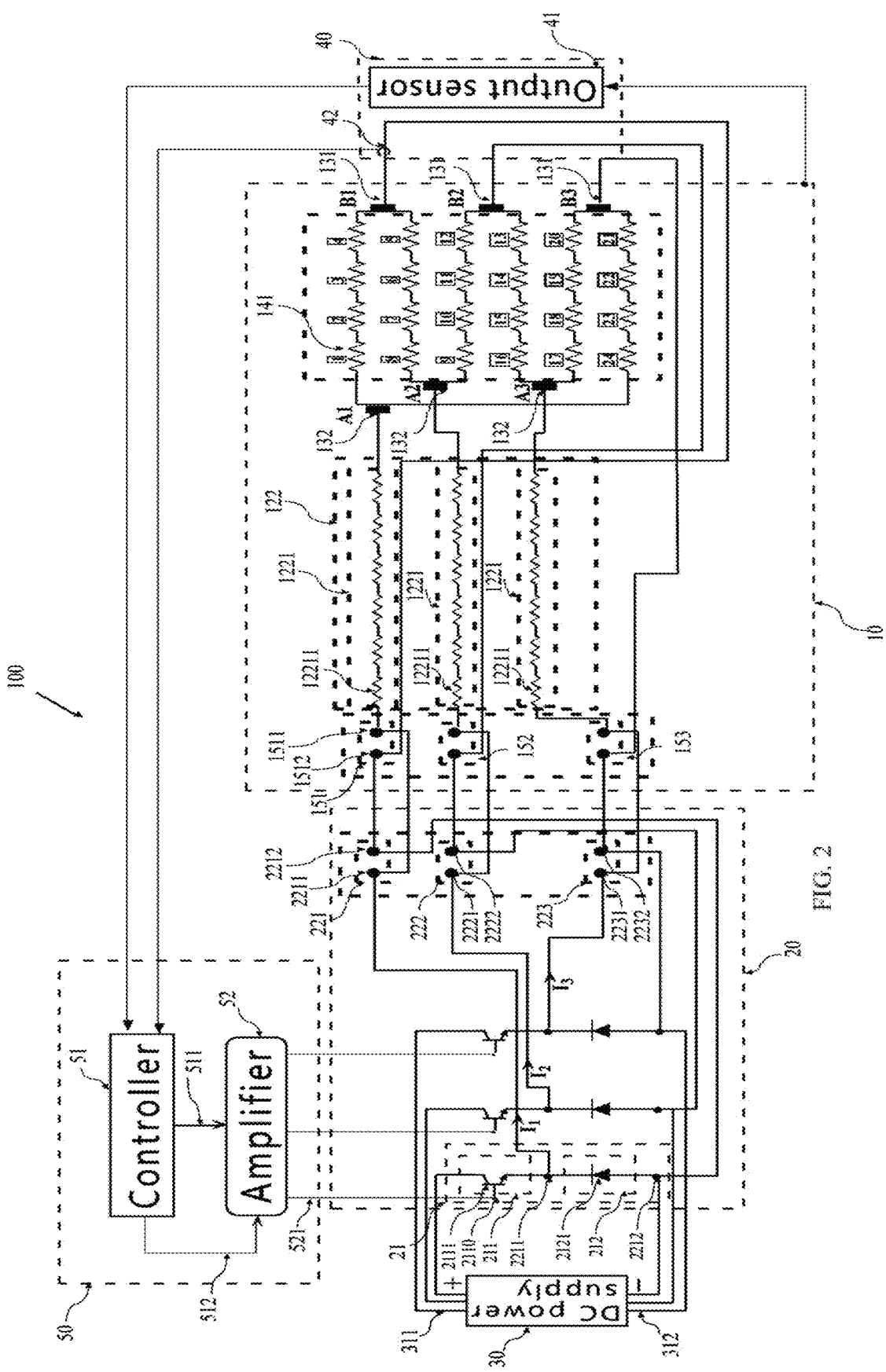
FIG. 2 is a circuit connection diagram of the series wound DC motor driving device in the state of m=3 in the embodiment I of the invention.

As shown in FIGS. 1 and 2, the series wound DC motor driving device 100 in the embodiment I is provided in electrical equipment such as a rolling mill, an electric locomotive, a large machine main shaft transmission system and a ship, and used for driving electrical equipment. The series wound DC motor driving device 100 comprises a series wound DC motor 10, a chopper 20, a DC power supply 30, a sensing portion 40 and a control portion 50.

Figure 3:
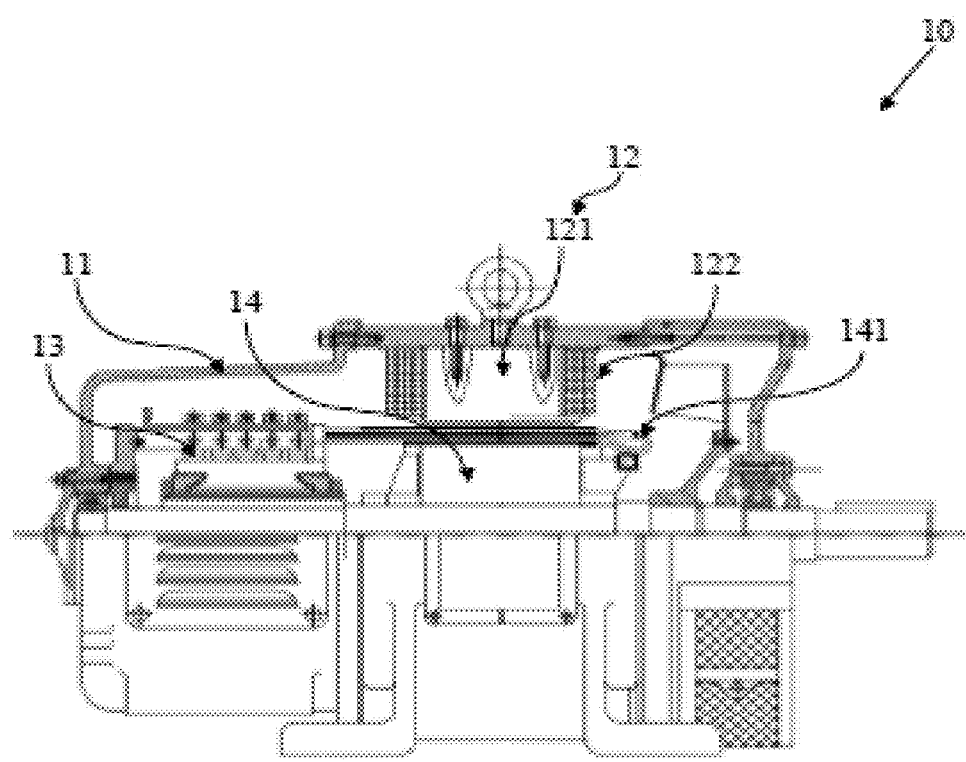
FIG. 3 is a longitudinal section diagram of a series wound DC motor in the embodiment I of the invention.
Figure 4:
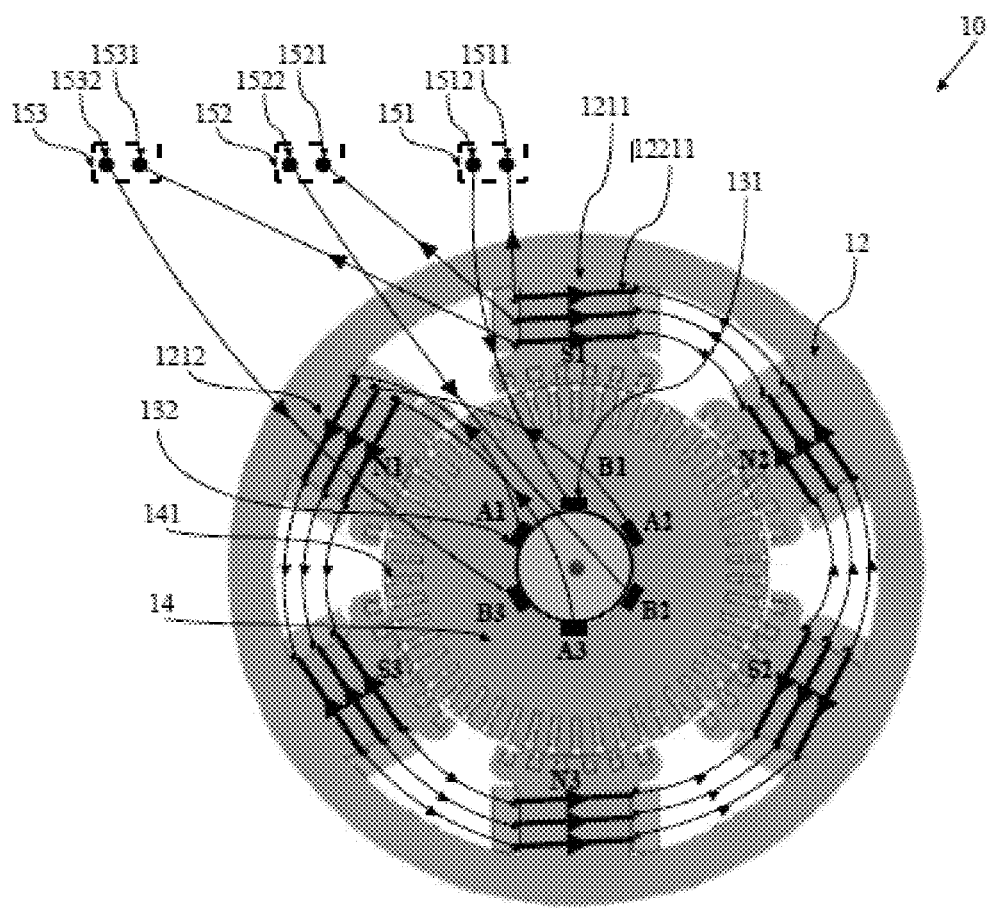
FIG. 4 is a cross section circuit connection diagram of the series wound DC motor in the embodiment I of the invention.

As shown in FIG. 1-4, the series wound DC motor 10 with a rated voltage and a rated current comprises a casing 11, a stator 12, an electrical brush 13, a rotor 14 and a junction box (not shown). As shown in FIG. 1, the logarithm of the electrical brush 13 is set to m according to the rated current value, and m is an integer not smaller than 2. As shown in FIGS. 2 and 4, m is set to 3 in the embodiment I.

As shown in FIG. 1-4, the stator 12 is arranged in the casing 11, and comprises 3 pairs of main magnetic poles 121 (6 pieces in total) and an excitation winding portion 122. Each main magnetic pole 121 comprises 3 excitation coils 12211, and each excitation coil 12211 is formed by winding insulated conductors composed of conductors wrapped with insulating layers on the main magnetic pole 121 respectively. The insulated conductor strips are either enameled wires or insulated copper conductor strips, and they are enameled wires in the embodiment I. The winding directions and numbers of turns of 3 excitation coils 12211 on each main magnetic pole 121 are the same in the embodiment I.

As shown in FIG. 4, one excitation winding unit 1221 as shown in FIG. 2 is formed by taking one excitation coil from each main magnetic pole 121 respectively and connecting 6 excitation coils 12211 in total. The excitation winding portion 122 comprises 3 excitation winding units 1221. The insulated conductor strips in each excitation winding unit 1221 include one end and the other end distinguished according to preset current directions of excitation coils 12211. Each pair of main magnetic poles 121 includes an S main magnetic pole 1211 and an N main magnetic pole 1212 corresponding to winding directions of excitation coils 12211 and preset current directions of excitation coils 12211.

The connection relation among 6 excitation coils 12211 in each excitation winding unit 1221 is any one of series connection, parallel connection and series-parallel connection, and the connection relations among 6 excitation coils 12211 in each excitation winding unit 1221 are the same. The connection relation among 6 excitation coils 12211 is series connection in the embodiment I.

As shown in FIG. 1-3, 3 pairs of electrical brushes 13 (6 pieces in total) are arranged in the casing 11. Each pair of electrical brushes 13 comprises an S-pole corresponding electrical brush 131 corresponding to the S main magnetic pole 1211, and an N-pole corresponding electrical brush 132 corresponding to the N main magnetic pole 1212.

The electrical brushes 13 are either narrow electrical brushes or wide electrical brushes, and they are narrow electrical brushes in the embodiment I. Each electrical brush 13 comprises an electrical brush body or at least two separately formed electrical brush bodies arranged along the axis of the motor and electrically connected in parallel; if the electrical brush 13 comprises at least two electrical brush bodies, the commutation ability of brushes can be improved by increasing the actual contact area between each brush and the commutator. As shown in FIG. 2-4, the electrical brush 13 comprises an electrical brush body in the embodiment I. As shown in FIG. 1, the m ends of the insulated conductor strips of all excitation winding units 1221 are electrically connected with m N-pole corresponding electrical brushes 132 among all electrical brushes 13; the m other ends of the insulated conductor strips of all excitation winding units 1221 form m first terminals 1511, the leading-out ends of m S-pole corresponding electrical brushes 131 that are not connected with the ends of the insulated conductor strips of m excitation winding units 1221 form m second terminals 1512, and the m first terminals 1511 and the m second terminals 1512 form m pairs of external terminals correspondingly. Of course, it is also allowed as needed that the m ends of the insulated conductor strips of all excitation winding units 1221 are electrically connected with m S-pole corresponding electrical brushes 131 among all electrical brushes 13, and the leading-out ends of m N-pole corresponding electrical brushes 132 that are not connected with the ends of the insulated conductor strips of m excitation winding units 1221 form m second terminals 1512.

In the embodiment I, as shown in FIGS. 2 and 4, the first terminal 1511 and the second terminal 1512 form 1 pair of external terminals 151 correspondingly, the first terminal 1521 and the second terminal 1522 form 1 pair of external terminals 152 correspondingly, and the first terminal 1531 and the second terminal 1532 form 1 pair of external terminals 153 correspondingly.

Figure 5:
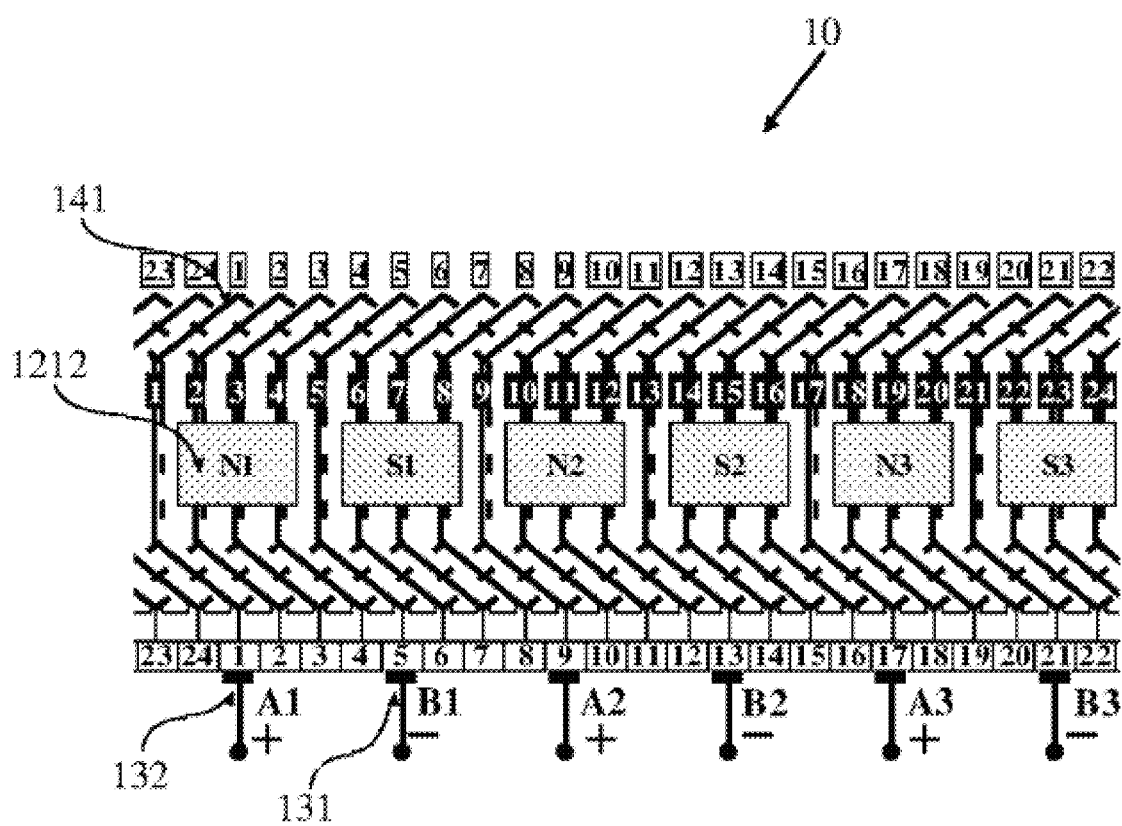
FIG. 5 is a single-lap connection and expansion diagram of an armature winding of the series wound DC motor in the embodiment I of the invention.
Figure 6:
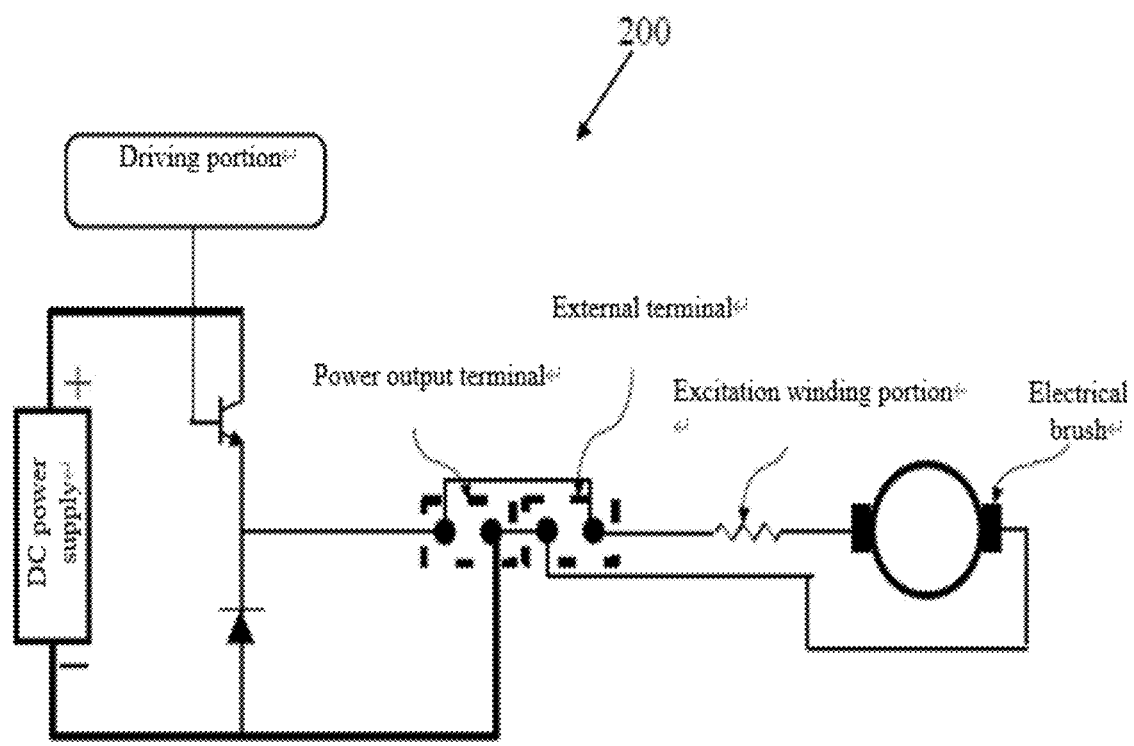
FIG. 6 is a circuit connection diagram of a traditional series wound DC motor driving device.

As shown in FIG. 1-4, the rotor 14 is arranged in the stator 12, and comprises a plurality of armature windings 141 connected with each other in a preset connecting mode. The number of armature windings 141 is set to 2m×q, and the preset connecting mode is any one of simplex lap, multiplex lap and multiplex wave. In the embodiment I, as shown in FIG. 5, the connecting mode of a plurality of armature windings 141 is simplex lap, the 2 adjacent electrical brushes 13 connect an armature winding branch circuit, and each armature winding branch circuit comprises q armature windings 141.

The junction box (not shown) is fixed on the casing 11, and as shown in FIGS. 2 and 4, 3 pairs of external terminals 151, 152 and 153 are arranged in the junction box.

As shown in FIG. 1, the chopper 20 is used for converting the constant voltage of the DC power supply 30 into a variable voltage with a controllable average voltage based on control signals from the control portion 50 and providing the variable voltage to the series wound DC motor 10. The chopper 20 comprises m chopping units 21 corresponding to m pairs of electrical brushes 13 respectively. In the embodiment I, as shown in FIG. 2, the chopper 20 comprises 3 chopping units 21.

Each chopping unit 21 comprises an upper bridge arm 211 and a lower bridge arm 212, which are connected with each other in series, as well as first power output ends 2211 and second power output ends 2212.

The upper bridge arm 211 comprises 1 power switch tube 2111 and a switch control end 2110, and the lower bridge arm 212 comprises 1 freewheeling diode 2121. The power switch tube 2111 comprises a control electrode, which forms the switch control end 2110. Therefore, the chopper is featured by the simple structure, reliability, high safety, easy control and low cost in the embodiment I.

When all power switch tubes 2111 have the same maximum output current $I_1$ and the series wound DC motor 10 has the maximum current $I_{max}$, m meets the following condition: $m > I_{max} \div I_1$. The maximum output current is an important parameter of power switch tubes, which can work stably only when the working current is below this current value. If the working current exceeds this current value, the power switch tubes will be broken down due to over-current and thus damaged.

In the embodiment I, all power switch tubes are semi-controlled or fully-controlled devices. The semi-controlled devices are ordinary thyristors. The fully controlled devices are any ones of power field effect transistors, gate-turn-off thyristors, integrated gate-commutated thyristors, insulated gate bipolar transistors and power bipolar transistors.

As shown in FIG. 1, the first power output end 2211 is arranged between the upper bridge arm 211 and the lower bridge arm 212, and the second power output end 2212 is arranged at the end of the connection position between the lower bridge arm 211 and the DC power supply 30. The m pairs of power output terminals 221 are formed at m first power output ends 2211 of all chopping units 21 and m second power output ends 2212 of all chopping units 21 correspondingly, and m pairs of power output terminals 221 are connected with m pairs of external terminals 151 correspondingly one by one.

In the embodiment I, as shown in FIG. 2, 1 pair of power output terminals 221 is formed at the first power output end 2211 and the second power output end 2212 correspondingly, 1 pair of power output terminals 222 is formed at the first power output end 2221 and the second power output end 2222 correspondingly, 1 pair of power output terminals 223 is formed at the first power output end 2231 and the second power output end 2232 correspondingly, and 3 pairs of power output terminals 221, 222 and 223 are connected with 3 pairs of external terminals 151, 152 and 153 correspondingly one by one.

As shown in FIGS. 1 and 2, the DC power supply 30 has a constant voltage corresponding to the rated voltage of the series wound DC motor 10, and m pairs of power output terminals connected with m chopping units 21 correspondingly one by one. Each pair of power output terminal comprises a positive electrode 311 and a negative electrode 312, wherein the positive electrode 311 is connected with the upper bridge arm 211 in the corresponding chopping unit 21, and the negative electrode 312 is connected with the lower bridge arm 212 in the corresponding chopping unit 21.

As shown in FIGS. 1 and 2, the control portion 50 receives an external command signal corresponding to the displacement, speed or torque output by the shunt wound DC motor 10.

The sensing portion 40 is used for testing the physical quantity of the series wound DC motor 10 and outputting a feedback signal to the control portion 50. The sensing portion 40 comprises an output sensor 41 and a current sensor 42.

The output sensor 41 is used for testing the displacement, speed or torque output by the series wound DC motor 10 and outputting a corresponding output feedback signal to the control portion 50.

The current sensor 42 is used for testing the current value of leading-out lines of electrical brushes in the series wound DC motor 10 and outputting a corresponding current feedback signal to the control portion 50.

The control portion 50 comprises a controller 51 and an amplifier 52.

According to the external command signal as well as the output feedback signal and the current feedback signal from the sensing portion 40, the controller 51 calculates and generates a control signal 511 and an enabling signal 512, and outputs them to the amplifier 52. The control signal 511 comprises m switch control signals formed according to the preset phase stagger rules and corresponding to the m chopping units 21 separately, and the enabling signal 512 is used for controlling the working state of the amplifier 52.

The amplifier 52 starts working under the control of the enabling signal 512, amplifies m switch control signals and provides them for m switch control ends 2110 correspondingly. The amplifier 52 has m amplifying signal output ends 521 corresponding to the m chopping units 21 separately, and the m amplifying signal output ends 521 are connected with the m switch control ends 2110 correspondingly one by one. In the embodiment I, the preset phase stagger rules refer to that the phases of the m switch control signals are separately staggered in sequence for 1/m of the switching period, and thus for output currents of power output terminals of m chopping units, the peak-to-peak value of ripples after superposition of current ripples is reduced, so that the peak-to-peak values of output torque and speed ripples are reduced, and the performance and life of the series wound DC motor are improved. Of course, it is also allowed as needed that when m is an even integer, the preset phase stagger rules refer to that the phases of the m switch control signals are separately staggered in sequence for 2/m of the switching period, so that the same current ripples are formed for output currents of power output terminals of each two chopping units corresponding to each two pairs of electrical brushes that are spatially opposite, and thus the moment of couple is produced in the motor, the friction torque caused between the shaft and the bearing in case that output torque ripples of the motor cannot form the moment of couple is avoided, the wear between the shaft and the bearing is reduced, and the performance and service life of the motor are improved.

In a steady state, the peak-to-peak value of current ripples is the difference between the maximum and the minimum, and the ripple coefficient is the ratio (in percentage) of the peak-to-peak value to the average value. The following description is given by using three pairs of electrical brushes A1B1, A2B2 and A3B3 with the same frequency of current ripples for output currents but with phases staggered in sequence for ⅓ of the switching period and setting the switching frequency of the chopper 20 to 1 kHz as an example.

Figure 7:
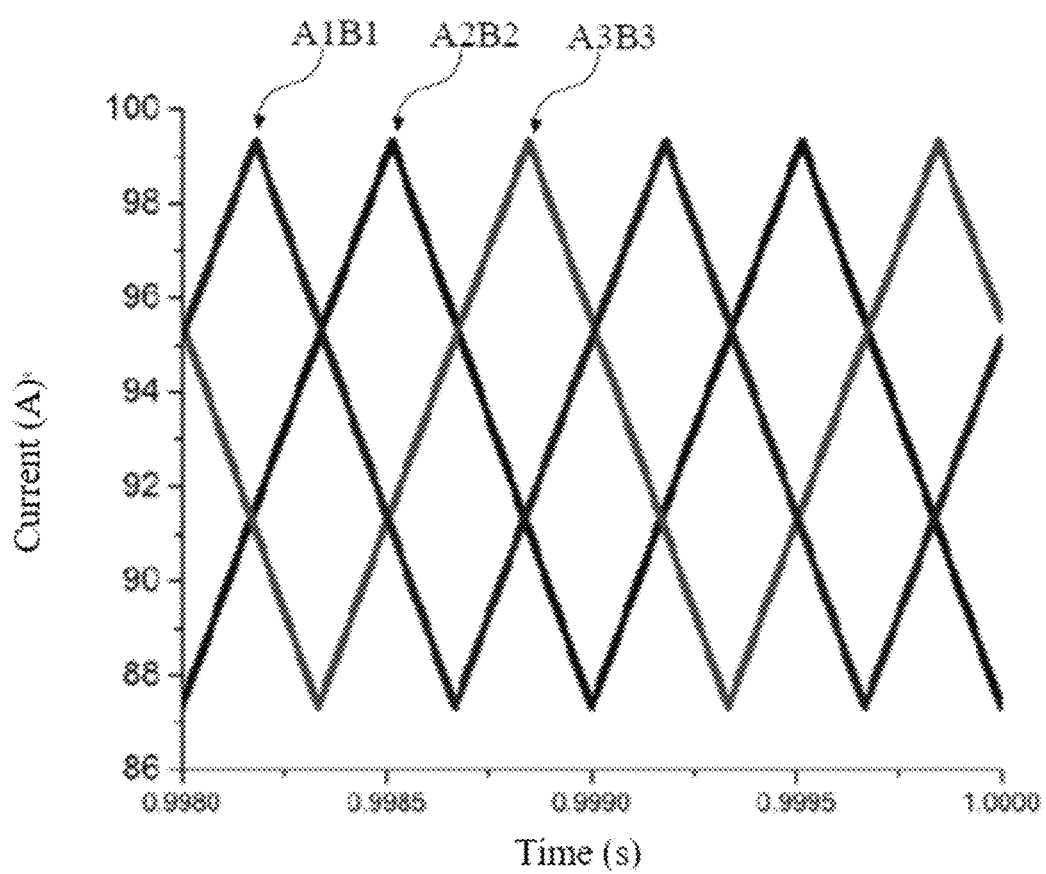
FIG. 7 is an input current oscillogram of the external terminal of the series wound DC motor in the embodiment I of the invention.

As shown in FIG. 7, for the three terminal units 151, 152 and 153 of the series wound DC motor in the embodiment I, input current ripples are equal to 99.32−87.36=11.96 amperes, average values are equal to 93.33 amperes, and ripple coefficients are equal to 11.96/93.33×100%=12.8%.

Figure 8:
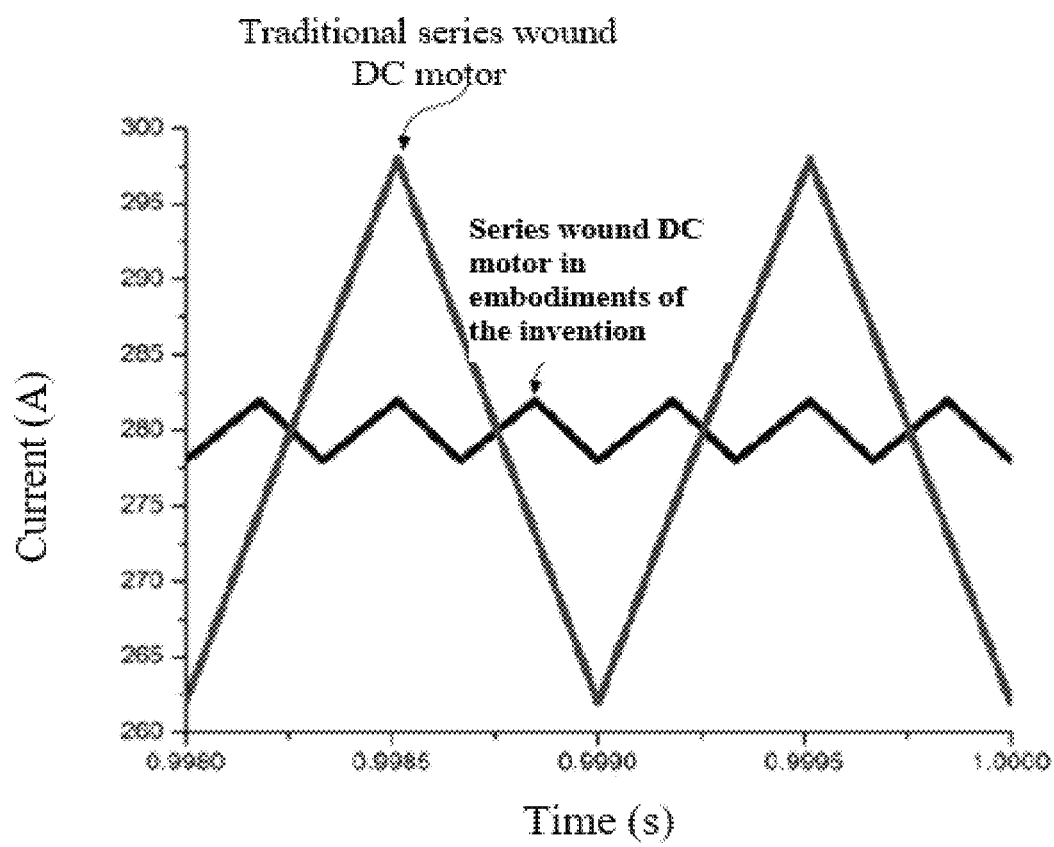
FIG. 8 is a diagram of comparison between the current of the series wound DC motor and the current of the traditional series wound DC motor in the embodiment I of the invention.

As shown in FIG. 8, in a steady state, for the series wound DC motor in the embodiment I, current ripples are equal to 281.96−278.00=3.96 amperes, average values are equal to 279.98 amperes, and ripple coefficients are equal to 3.96/279.98×100%=1.41%. For the traditional series wound DC motor, current ripples are equal to 297.95−261.99=35.96 amperes, average values are equal to 279.98 amperes, and ripple coefficients are equal to 3.96/279.98×100%=12.8%. Though the series wound DC motor 10 in the embodiment I and the traditional series wound DC motor have the same average current values, current ripples and ripple coefficients of the series wound DC motor 10 in the embodiment I are merely 1/9 of those of the traditional series wound DC motor. The electromagnetic torque and motion equation of the series wound DC motor is known as follows:

$$\begin{cases} T_{em} = C_T \Phi I_a = L_{af} I_f I_a & (1) \\ T_{em} - T_{load} = J \dfrac{d}{dt} \Omega & (2) \end{cases}$$

where $T_{em}$ is the electromagnetic torque; $C_T$ is the torque constant; $\Phi$ is the magnetic flux of the main magnetic field; $L_{af}$ is the mutual inductance of the excitation winding portion and the armature winding as a constant; $I_f$ is the excitation current; $I_a$ is the armature current; $T_{load}$ is the load torque; J is the rotational inertia of the load as a constant; $\Omega$ is the output angular speed.

In the embodiment I, the input current of the series wound DC motor is equal to the armature current and equal to the excitation current. The rated input current of the series wound DC motor is the maximum input current when the motor is in the rated working state.

In Formula (1), the electromagnetic torque is directly proportional to the product of the armature current $I_a$ and the magnetic flux of the main magnetic field $\Phi$. The main magnetic field of the DC motor is excited by the excitation winding portion powered by the chopper. According to Formula (1), the electromagnetic torque $T_{em}$ is directly proportional to the product of the armature current $I_a$ and the excitation current $I_f$. The ripple coefficient of the excitation current $I_f$ and the ripple coefficient of the armature current $I_a$ cause a larger ripple coefficient produced by the electromagnetic torque $T_{em}$, larger pulses or ripples of the output angular speed $\Omega$, and poorer performance of the driving device and the electrical equipment.

Figure 9:
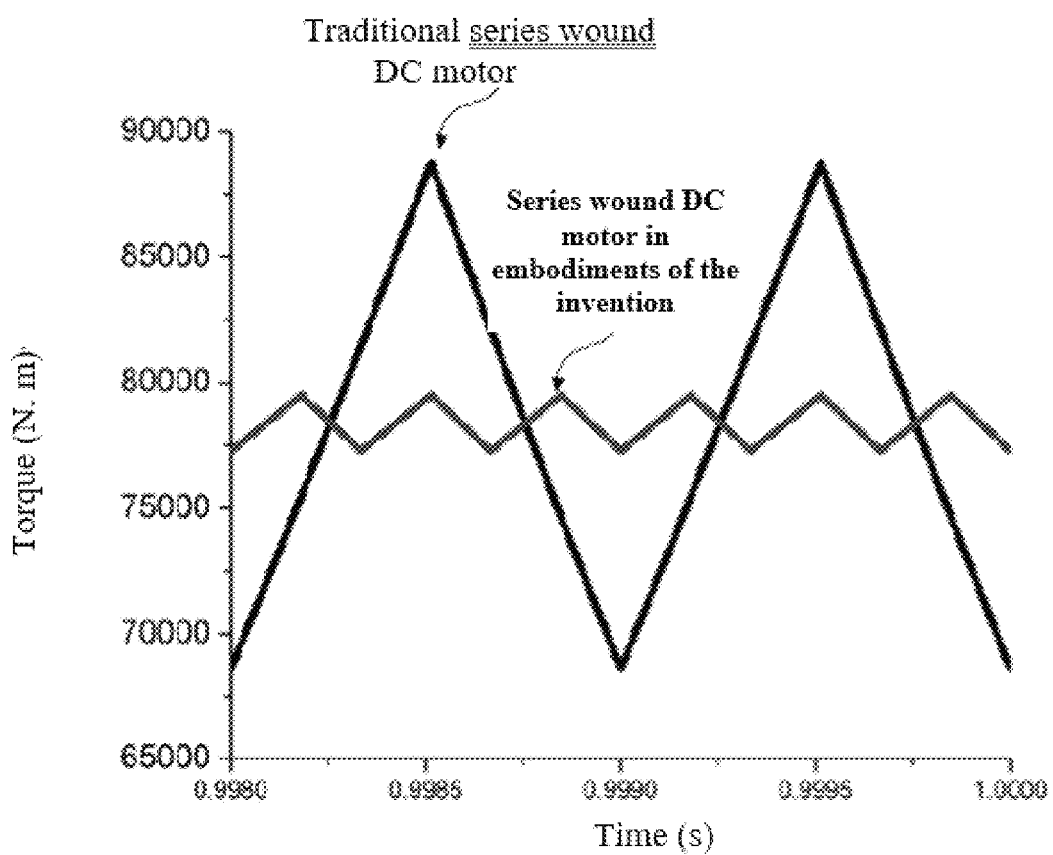
FIG. 9 is a diagram of comparison between the torque of the series wound DC motor and the torque of the traditional series wound DC motor in the embodiment I of the invention.

In the embodiment I, $L_{af}$ is taken as 1. In a steady state, as shown in FIG. 9, for the series wound DC motor 10 in the embodiment I, torque ripples are equal to 79503.7−77281.1=2222.6 N·m, average values are equal to 78390.9 N·m, and ripple coefficients are equal to 2.84%. For the traditional series wound DC motor, torque ripples are equal to 88776.6−68639.9=20136.7 N·m, average values are equal to 78497.4 N·m, and ripple coefficients are equal to 25.65%.

Figure 10:
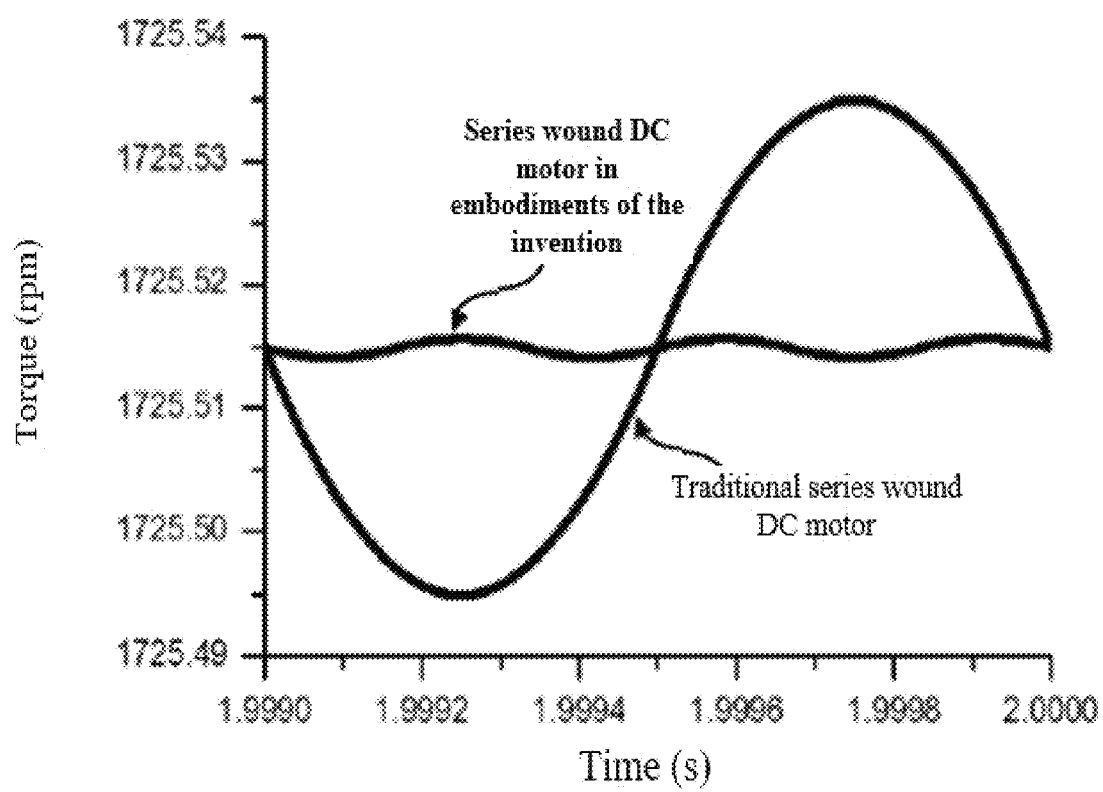
FIG. 10 is a diagram of comparison between the speed of the series wound DC motor and the speed of the traditional series wound DC motor in the embodiment I of the invention.

As shown in FIG. 10, in a steady state, for the series wound DC motor 10 in the embodiment I, peak-to-peak values of speed ripples are equal to 1725.5157−1725.5142=0.0015 rpm, average values are equal to 1725.515 rpm, and ripple coefficients are equal to 0.000087%. For the traditional series wound DC motor, peak-to-peak values of speed ripples are equal to 1725.535−1725.4949=0.0401 rpm, average values are equal to 1725.515 rpm, and ripple coefficients are equal to 0.002324%. Though the series wound DC motor 10 in the embodiment I and the traditional series wound DC motor have the same average speed values, the ratio of peak-to-peak values of speed ripples and ripple coefficients of the series wound DC motor 10 in the embodiment I to those of the traditional series wound DC motor is 1/26.7.

In other words, though the series wound DC motor 10 in the embodiment I and the traditional series wound DC motor have basically the same average torque values, peak-to-peak values of torque ripples and ripple coefficients of the series wound DC motor 10 in the embodiment I are merely 1/9 of those of the traditional series wound DC motor. The peak-to-peak values of output torque ripples and ripple coefficients of the motor are reduced, and thus peak-to-peak values of output speed ripples and ripple coefficients of the motor are reduced. The speed ripple coefficients of the series wound DC motor in the embodiment I are merely 1/26 of those of the traditional series wound DC motor, which finally achieves the purposes of reducing the electromagnetic interference, vibration and noise of the motor, and improving the performance of the series wound DC motor and the driving device.

Embodiment II

Figure 11:
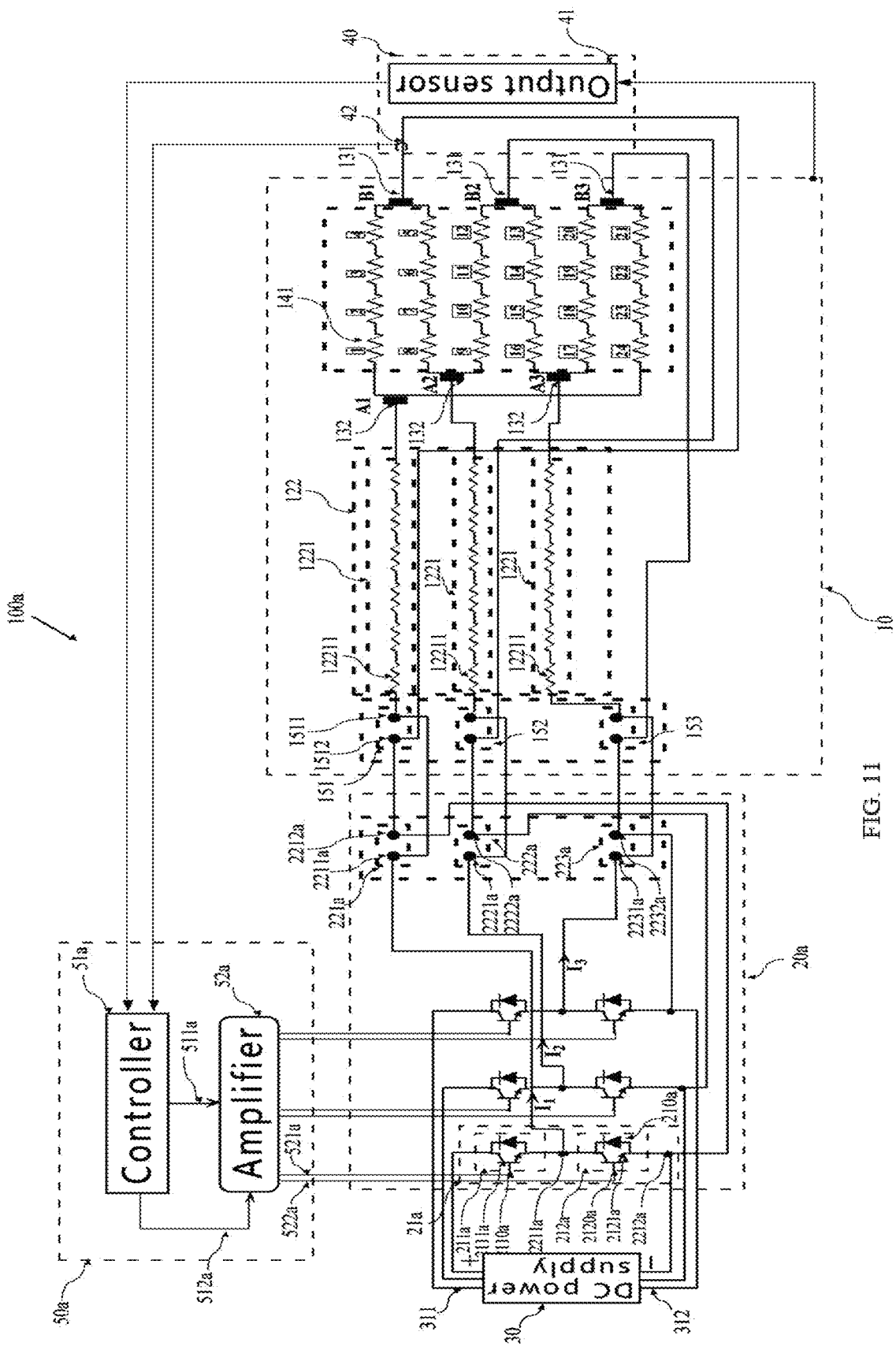
FIG. 11 is a circuit connection diagram of the series wound DC motor driving device in the state of m=3 in the embodiment II of the invention.

In the embodiment II, for the structure the same as that in the embodiment I, the same symbols are given and the same description is omitted. As shown in FIG. 11, the series wound DC motor driving device 100a comprises a series wound DC motor 10, a chopper 20a, a DC power supply 30, a sensing portion 40 and a control portion 50a.

The chopper 20a comprises 3 chopping units 21a. Each chopping unit 21a comprises an upper bridge arm 211a and a lower bridge arm 212a, which are connected with each other in series, as well as first power output ends 2211a and second power output ends 2212a.

The upper bridge arm 211a comprises 1 power switch tube 2111a, a diode 210a connected with the power switch tube 2111a in parallel reversely, and an upper bridge arm switch control end 2110a. The lower bridge arm 212a comprises 1 power switch tube 2121a, a diode 210a connected with the power switch tube 2121a in parallel reversely, and a lower bridge arm switch control end 2120a.

The first power output end 2211a is arranged between the upper bridge arm 211a and the lower bridge arm 212a, and the second power output end 2212a is arranged at the end of the connection position between the lower bridge arm 212a and the DC power supply 30. 1 pair of power output terminals 221a is formed at the first power output end 2211a and the second power output end 2212a correspondingly, 1 pair of power output terminals 222a is formed at the first power output end 2221a and the second power output end 2222a correspondingly, 1 pair of power output terminals 223a is formed at the first power output end 2231a and the second power output end 2232a correspondingly, and 3 pairs of power output terminals 221a, 222a and 223a are connected with 3 pairs of external terminals 151, 152 and 153 of the motor correspondingly one by one.

The control portion 50a comprises a controller 51a and an amplifier 52a.

The controller 51a outputs a control signal 511a and an enabling signal 512a to the amplifier 52a. The control signal 511a comprises 3 unit control signals formed according to the preset phase stagger rules and corresponding to the 3 chopping units 21a separately, and each unit control signal comprises two switch control signals corresponding to two switch control ends 2110a and 2120a in the corresponding chopping unit 21a. The enabling signal 512a is used for controlling the working state of the amplifier 52a.

The amplifier 52a starts working under the control of the enabling signal 512a, amplifies two switch control signals in each unit control signal and provides them for two switch control ends 2110a and 2120a. The amplifier 52a has 3 amplifying signal output portions corresponding to the 3 chopping units 21a separately, and each amplifying signal output portion is composed of two amplifying signal output ends 521a and 522a. The two amplifying signal output ends 521a and 522a of each amplifying signal output portion are connected with two switch control ends 2110a and 2120a in the corresponding chopping unit 21a. Specifically, the amplifying signal output end 521a is connected with the upper bridge arm switch control end 2110a, and the amplifying signal output end 522a is connected with the lower bridge arm switch control end 2120a.

In the embodiment II, the preset phase stagger rules refer to that the m phases corresponding to the m unit control signals are used as m preset phases staggered in sequence for 1/m of the switching period. In each chopping unit, the switch control signal corresponding to the upper bridge arm switch control end is set as a reference switch control signal, and the phase of the reference switch control signal is set according to the preset phase corresponding to the unit control signal; the switch control signal corresponding to the lower bridge arm switch control end is set oppositely to the reference switch control signal, and thus for output currents of power output terminals of m chopping units, the peak-to-peak value of ripples after superposition of current ripples is reduced, so that the peak-to-peak values of output torque and speed ripples are reduced, and the performance and life of the series wound DC motor are improved. Of course, it is also allowed as needed that when m is an even integer, the preset phase stagger rules refer to that the m phases corresponding to the m unit control signals are used as m preset phases staggered in sequence for 2/m of the switching period, so that the same current ripples are formed for output currents of power output terminals of each two chopping units corresponding to each two pairs of electrical brushes that are spatially opposite, and thus the moment of couple is produced in the motor, the friction torque caused between the shaft and the bearing in case that output torque ripples of the motor cannot form the moment of couple is avoided, the wear between the shaft and the bearing is reduced, and the performance and service life of the motor are improved.

The series wound DC motor in the embodiment II can work in a state as shown in FIG. 7-10 and have the same functions and effect as those in the embodiment I. The upper bridge arm and the lower bridge arm each comprise at least one power switch tube, and at least one diode connected with the power switch tube in parallel reversely. The series wound DC motor can also work in a state as a generator, in which it feeds energy back to the power supply during deceleration and braking to improve the system performance.

Embodiment III

In the embodiment III, for the structure the same as that in the embodiment I, the same symbols are given and the same description is omitted.

Figure 12:
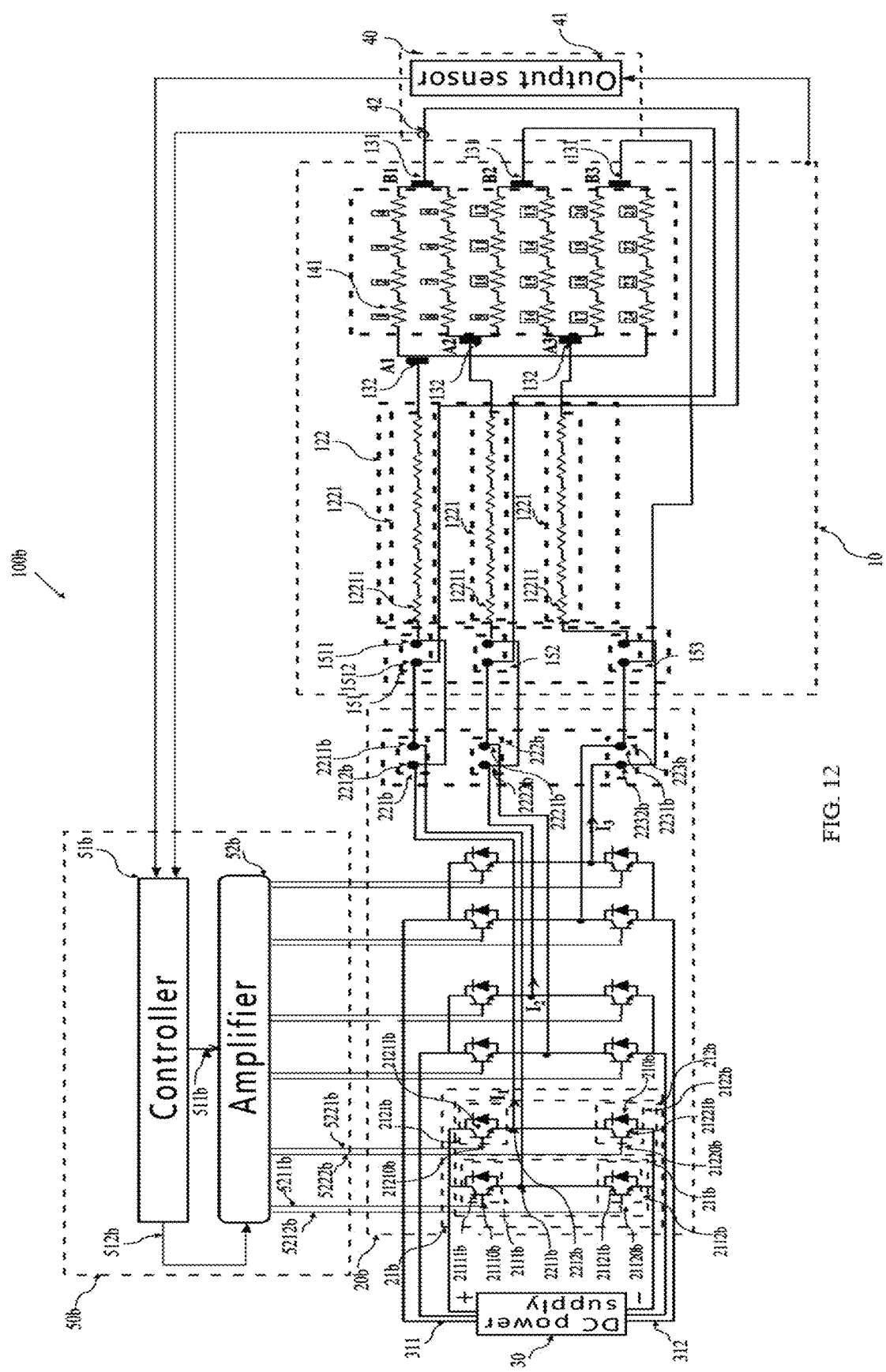
FIG. 12 is a circuit connection diagram of the series wound DC motor driving device in the state of m=3 in the embodiment III of the invention.

As shown in FIG. 12, the series wound DC motor driving device 100*b* comprises a series wound DC motor 10, a chopper 20*b*, a DC power supply 30, a sensing portion 40 and a control portion 50*b*.

The chopper 20*b* comprises 3 chopping units 21*b*. Each chopping unit 21*b* comprises a first bridge arm 211*b* and a second bridge arm 212*b*, as well as first power output ends 2211*b* and second power output ends 2212*b*. The first bridge arm 211*b* comprises a first upper bridge arm 2111*b* and a first lower bridge arm 2112*b*, which are connected with each other in series. The second bridge arm 212*b* comprises a second upper bridge arm 2121*b* and a second lower bridge arm 2122*b*, which are connected with each other in series. The first bridge arm 211*b* and the second bridge arm 212*b* are connected with each other in parallel. The first upper bridge arm 2111*b* comprises one power switch tube 21111*b*, a diode 210*b* connected with the power switch tube in parallel reversely, and a switch control end 21110*b*. The first lower bridge arm 2112*b* comprises one power switch tube 21121*b*, a diode 210*b* connected with the power switch tube in parallel reversely, and a switch control end 21120*b*. The second upper bridge arm 2121*b* comprises one power switch tube 21211*b*, a diode 210*b* connected with the power switch tube in parallel reversely, and a switch control end 21210*b*. The second lower bridge arm 2122*b* comprises one power switch tube 21221*b*, a diode 210*b* connected with the power switch tube in parallel reversely, and a switch control end 21220*b*.

The first power output end 2211*b* is arranged between the first upper bridge arm 2111*b* and the first lower bridge arm 2112*b*, and the second power output end 2212*b* is arranged between the second upper bridge arm 2121*b* and the second lower bridge arm 2122*b*. 1 pair of power output terminals 221*b* is formed at the first power output end 2211*b* and the second power output end 2212*b* correspondingly, 1 pair of power output terminals 222*b* is formed at the first power output end 2221*b* and the second power output end 2222*b* correspondingly, 1 pair of power output terminals 223*b* is formed at the first power output end 2231*b* and the second power output end 2232*b* correspondingly, and 3 pairs of power output terminals 221*b*, 222*b* and 223*b* are connected with 3 pairs of external terminals 151, 152 and 153 correspondingly one by one.

For the DC power supply 30, the positive electrode 311 is connected with the first upper bridge arm 2111*b* and the second upper bridge arm 2121*b* in the corresponding chopping unit 21*b*, and the negative electrode 312 is connected with the first lower bridge arm 2112*b* and the second lower bridge arm 2122*b* in the corresponding chopping unit 21*b*.

The control portion 50*b* comprises a controller 51*b* and an amplifier 52*b*. The controller 51*b* outputs a control signal 511*b* and an enabling signal 512*b* to the amplifier 52*b*. The control signal 511*b* comprises 3 unit control signals formed according to the preset phase stagger rules and corresponding to the 3 chopping units 21*b* separately, and each unit control signal comprises four switch control signals corresponding to four switch control ends 21110*b*, 21120*b*, 21210*b* and 21220*b* in the corresponding chopping unit 21*b*. The enabling signal 512*b* is used for controlling the working state of the amplifier 52*b*.

The amplifier 52*b* starts working under the control of the enabling signal 512*b*, amplifies four switch control signals in each unit control signal and provides them for four switch control ends 21110*b*, 21120*b*, 21210*b* and 21220*b*. The amplifier 52*b* has 3 amplifying signal output portions corresponding to the 3 chopping units 21*b* separately, and each amplifying signal output portion is composed of four amplifying signal output ends 5211*b*, 5212*b*, 5221*b* and 5222*b*, which are connected with four switch control ends 21110*b*, 21120*b*, 21210*b* and 21220*b* in the corresponding chopping unit 21*b*. Specifically, the amplifying signal output end 5211*b* is connected with the first upper bridge arm switch control end 21110*b*, the amplifying signal output end 5212*b* is connected with the first lower bridge arm switch control end 21120*b*, the amplifying signal output end 5221*b* is connected with the second upper bridge arm switch control end 21210*b*, the amplifying signal output end 5222*b* is connected with the second lower bridge arm switch control end 21220*b*.

In the embodiment III, the preset phase stagger rules refer to that the m phases corresponding to the m unit control signals are used as m preset phases staggered in sequence for 1/m of the switching period. In each chopping unit, the two switch control signals corresponding to the first upper bridge arm switch control end and the second lower bridge arm switch control end are set as reference switch control signals, and the phase of the reference switch control signals is set according to the preset phase corresponding to the unit control signal; the two switch control signals corresponding to the first lower bridge arm switch control end and the second upper bridge arm switch control end are set oppositely to the reference switch control signals, and thus for output currents of power output terminals of m chopping units, the peak-to-peak value of ripples after superposition of current ripples is reduced, so that the peak-to-peak values of output torque and speed ripples are reduced, and the performance and life of the series wound DC motor are improved. Of course, it is also allowed as needed that when m is an even integer, the preset phase stagger rules refer to that the m phases corresponding to the m unit control signals are used as m preset phases staggered in sequence for 2/m of the switching period, so that the same current ripples are formed for output currents of power output terminals of each two chopping units corresponding to each two pairs of electrical brushes that are spatially opposite, and thus the moment of couple is produced in the motor, the friction torque caused between the shaft and the bearing in case that output torque ripples of the motor cannot form the moment of couple is avoided, the wear between the shaft and the bearing is reduced, and the performance and service life of the motor are improved.

The series wound DC motor in the embodiment III can work in a state as shown in FIG. 7-10 and have the same functions and effect as those in the embodiment I. The first upper bridge arm, first lower bridge arm, second upper bridge arm and second lower bridge arm each comprise at least one power switch tube, and at least one diode connected with the power switch tube in parallel reversely. Therefore, the series wound DC motor can also work in four quadrants for flexible and maneuverable control.

Functions and Effect of Embodiments

According to the series wound DC motor driving device and electrical equipment comprising the same involved in the embodiments I-III, the chopper comprises m chopping units; each chopping unit comprises first power output ends and second power output ends and m switch control ends, and the control signals comprise m unit control signals formed according to the preset phase stagger rules and corresponding to the m chopping units separately; each unit control signal comprises w switch control signals corresponding to the w switch control ends in the corresponding chopping units; the w switch control ends are used for receiving the w switch control signals correspondingly; m pairs of power output terminals are formed at the m first power output ends and m second power output ends of the chopping units correspondingly; the series wound DC motor comprises a casing, m pairs of electrical brushes fixed in the casing, a stator comprising m pairs of main magnetic poles corresponding to m pairs of electrical brushes and an excitation winding portion, and a rotor arranged in the stator and comprising a plurality of armature windings connected with each other in a preset connecting mode; each pair of main magnetic poles includes an S main magnetic pole and an N main magnetic pole, and the two adjacent main magnetic poles are different in polarity; the positions of two electrical brushes in each pair of electrical brushes are adjacent, and each pair of electrical brushes comprises an S-pole corresponding electrical brush corresponding to the S main magnetic pole, and an N-pole corresponding electrical brush corresponding to the N main magnetic pole; the excitation winding portion comprises m excitation winding units, and each excitation winding unit is formed by making insulated conductor strips composed of metal wires wrapped with insulating layers into excitation coils on at least one pair of main magnetic poles; each insulated conductor strip in each excitation winding unit includes one end and the other end, and the m ends of the insulated conductor strips are electrically connected with m S-pole corresponding electrical brushes among the electrical brushes to form m first terminals; meanwhile, the m other ends of the insulated conductor strips are electrically connected with m N-pole corresponding electrical brushes among the electrical brushes to form m second terminals; or, the m ends of the insulated conductor strips are electrically connected with m N-pole corresponding electrical brushes among the electrical brushes to form m first terminals; meanwhile, the m other ends of the insulated conductor strips are electrically connected with m S-pole corresponding electrical brushes among the electrical brushes to form m second terminals; the m first terminals and the m second terminals form m pairs of external terminals correspondingly, and m pairs of external terminals are connected with m pairs of power output terminals correspondingly one by one; m is a positive integer smaller than 2, and w is 1, 2, or 4, that is to say, each pair of external terminals is connected with an excitation winding unit and a pair of electrical brushes, and the excitation winding unit and the electrical brushes are connected in series; thus, on one hand, each excitation winding unit and a branch circuit composed of a pair of electrical brushes connected correspondingly are independent, and the current of each branch circuit is also independent; each branch circuit can work independently, and is powered on by a pair of corresponding power output terminals independently, that is, each pair of power output terminals only bears the working current of one branch circuit, and the working current accounts for 1/m of the rated current of the motor; thus, even for the motor with a high rated current, as long as m is large enough, the working current of each branch circuit or the output current for each pair of power output terminals can be reduced correspondingly; the output current of the power output terminal can be reduced to the extent that the requirements of the high-power and high-performance motor can be met without adopting a parallel balanced current technology but using a common power switch tube or a power module; not only is the cost reduced, but also the requirements of a connecting wire and a connecting piece between the external terminal and the power output terminal for contact resistance and insulation are reduced; the difficulty in manufacturing is reduced, and the improvement of the system reliability and safety is benefited.

On the other hand, the control signals comprise m unit control signals formed according to the preset phase stagger rules and corresponding to the m chopping units separately, so that the current ripple phases of each pair of power output terminals are different; thus, the peak-to-peak value of ripples after superposition of m current ripples is reduced, so that the peak-to-peak values of output torque and speed ripples are reduced, and the performance and life of the series wound DC motor are improved.

Moreover, in case the electrical brushes in the motor, the excitation winding unit and the connecting wire malfunction, only the part where the fault is located is shielded, and other normal parts can still work; the phenomenon that a traditional series wound DC motor is out of control suddenly, and the system reliability and safety are improved.

In conclusion, the series wound DC motor driving device in the embodiments has the advantages of simple structure, short connecting wire, simple production process, easy manufacturing, convenient maintenance, low production cost and maintenance cost, rational and simple design, high reliability and safety, etc., so that the series wound DC motor driving device not only can be applied to high load electrical equipment, such as electric vehicles, electric trucks, rail vehicles, sightseeing vehicles, wagons and ships, but also can be applied to high-performance electrical equipment, such as CNC machine tools and submarines.

Variation Embodiment

In the variation embodiment, for the structure the same as that shown in FIG. 4, the same symbols are given and the same description is omitted.

Figure 13:
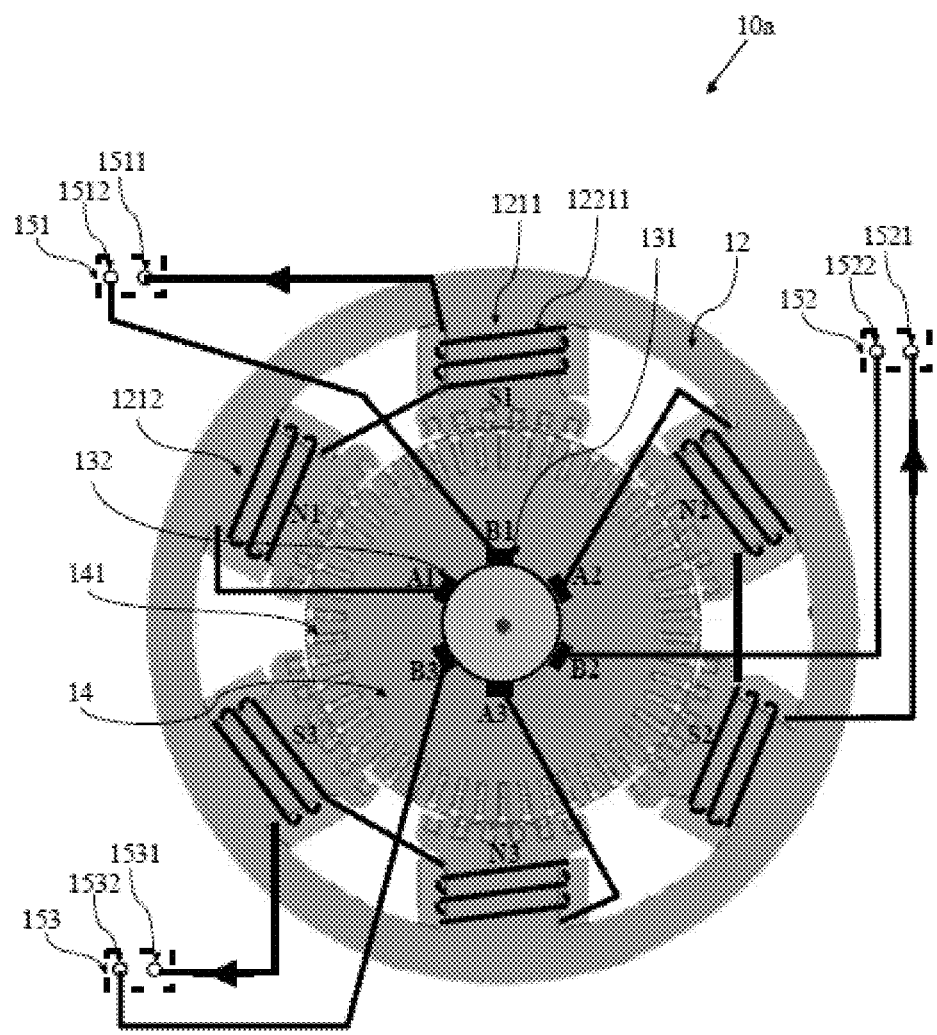
FIG. 13 is a cross section circuit connection diagram of the series wound DC motor in the variation embodiment of the invention.

As shown in FIG. 13, for the series wound DC motor 10a, the 3 excitation winding units correspond to 3 pairs of main magnetic poles separately, and the insulated conductor strips in each excitation winding unit are formed on a pair of corresponding main magnetic poles. The numbers of turns of the excitation coils on each main magnetic pole are the same, and each pair of main magnetic poles corresponds to the spatial position of the corresponding electrical brushes; the connection relation between the two excitation coils in each excitation winding unit is series connection or parallel connection, and the connection relation between the two excitation coils in each excitation winding unit is the same. The series wound DC motor 10a can replace the series wound DC motor 10 in embodiments I-III. It not only has the same functions and effect as those in embodiments I-III, but also can output a larger effective torque when some units needs to be shielded in case of any fault in the motor, because the magnetic field excited by the excitation winding unit of the non-faulty part mainly acts on the armature winding branch circuit connected with the corresponding electrical brush.

This embodiment is a preferred case of the invention, and is not intended for limiting the protection scope of the invention.

For example, in occasions with higher precision requirements for the armature current, speed and torque of a series wound DC motor working in a steady state, m can also be set according to peak-to-peak values of the corresponding armature current, speed and torque ripples as well as ripple coefficients.

The invention claimed is:

1. A series wound DC motor driving device, characterized in that it comprises:
   a series wound DC motor with a rated voltage;
   a DC power supply with a constant voltage corresponding to the rated voltage; and
   a chopper used for converting the constant voltage into a variable voltage and providing the variable voltage to the series wound DC motor based on control signals,
   wherein the chopper comprises m chopping units;
   each chopping unit comprises first power output ends and second power output ends and w switch control ends;
   the control signals comprise m unit control signals formed according to preset phase stagger rules and corresponding to the m chopping units separately;
   each unit control signal comprises w switch control signals corresponding to the w switch control ends in the corresponding chopping units;
   the w switch control ends are used for receiving the w switch control signals correspondingly;
   m pairs of power output terminals are formed at the m first power output ends and m second power output ends of the chopping units correspondingly;
   the series wound DC motor comprises:
   m pairs of electrical brushes;
   a stator comprising m pairs of main magnetic poles corresponding to m pairs of electrical brushes and an excitation winding portion, and
   a rotor arranged in the stator and comprising a plurality of armature windings connected with each other in a preset connecting mode;
   each pair of main magnetic poles includes an S main magnetic pole and an N main magnetic pole;
   the two adjacent main magnetic poles are different in polarity;
   the positions of two electrical brushes in each pair of electrical brushes are adjacent;
   each pair of electrical brushes comprises an S-pole corresponding electrical brush corresponding to the S main magnetic pole, and an N-pole corresponding electrical brush corresponding to the N main magnetic pole;

the excitation winding portion comprises m excitation winding units;

each excitation winding unit is formed by making insulated conductor strips composed of metal wires wrapped with insulating layers into excitation coils on at least one pair of main magnetic poles;

each insulated conductor strip in each excitation winding unit includes one end and the other end;

the m ends of the insulated conductor strips are electrically connected with m N-pole corresponding electrical brushes among all electrical brushes; meanwhile, the m other ends of the insulated conductor strips form m first terminals, the leading-out ends of m S-pole corresponding electrical brushes form m second terminals; or, the m ends of the insulated conductor strips are electrically connected with m S-pole corresponding electrical brushes among all electrical brushes; meanwhile, the m other ends of the insulated conductor strips form m first terminals, the leading-out ends of m N-pole corresponding electrical brushes form m second terminals;

the m first terminals and the m second terminals form m pairs of external terminals correspondingly;

m pairs of external terminals are connected with m pairs of power output terminals correspondingly one by one;

m is a positive integer not smaller than 2, and w is 1, 2, or 4.

2. The series wound DC motor driving device according to claim 1, characterized in that:

wherein the w is 1;

each chopping unit further comprises an upper bridge arm and a lower bridge arm which are connected with each other in series;

the upper bridge arm is connected with a positive electrode of the DC power supply, and the lower bridge arm is connected with a negative electrode of the DC power supply;

the upper bridge arm comprises at least one power switch tube and switch control end;

each power switch tube comprises a control electrode;

the switch control end is formed on the basis of the control electrode;

the lower bridge arm comprises at least one diode;

the first power output end is arranged between the upper bridge arm and the lower bridge arm, and the second power output end is arranged at the end of the connection position between the lower bridge arm and the DC power supply.

3. The series wound DC motor driving device according to claim 2, characterized in that:

wherein the preset phase stagger rules refer to that the phases of the w switch control signals are separately staggered in sequence for 1/m of the switching period; or the m is an even integer;

the preset phase stagger rules refer to that the phases of the w switch control signals are separately staggered in sequence for 2/m of the switching period.

4. Electrical equipment, characterized in that it comprises:

the series wound DC motor driving device, wherein the series wound DC motor driving device is the series wound DC motor driving device according to claim 3.

5. The electrical equipment according to claim 4, characterized in that:

wherein the electrical equipment is any one of a rolling mill, an electric locomotive, a machine main shaft transmission system and a ship.

6. Electrical equipment, characterized in that it comprises:

the series wound DC motor driving device, wherein the series wound DC motor driving device is the series wound DC motor driving device according to claim 2.

7. The electrical equipment according to claim 6, characterized in that:

wherein the electrical equipment is any one of a rolling mill, an electric locomotive, a machine main shaft transmission system and a ship.

8. The series wound DC motor driving device according to claim 1, characterized in that:

wherein the w is 2;

each chopping unit further comprises an upper bridge arm and a lower bridge arm which are connected with each other in series;

the upper bridge arm is connected with a positive electrode of the DC power supply, and the lower bridge arm is connected with a negative electrode of the DC power supply;

the upper bridge arm and the lower bridge arm each comprise at least one power switch tube, at least one diode connected with the power switch tube, and the switch control end;

each power switch tube comprises a control electrode;

the switch control end is formed on the basis of the control electrode;

the switch control end in the upper bridge arm, as an upper bridge arm switch control end, and the switch control end in the lower bridge arm, as an lower bridge arm switch control end, are used for correspondingly receiving two switch control signals;

the first power output end is arranged between the upper bridge arm and the lower bridge arm, and the second power output end is arranged at the end of the connection position between the lower bridge arm and the DC power supply.

9. The series wound DC motor driving device according to claim 8, characterized in that:

wherein, in each chopping unit, the switch control signal corresponding to the upper bridge arm switch control end is set as a reference switch control signal, and the phase of the reference switch control signal is set according to the preset phase corresponding to the unit control signal; the switch control signal corresponding to the lower bridge arm switch control end is set oppositely to the reference switch control signal;

the preset phase stagger rules refer to that the m phases corresponding to the m unit control signals are used as m preset phases staggered in sequence for 1/m of the switching period; or the m is an even integer, and the preset phase stagger rules refer to that the m phases corresponding to the m unit control signals are used as m preset phases staggered in sequence for 2/m of the switching period.

10. The series wound DC motor driving device according to claim 1, characterized in that:

wherein the w is 4;

each chopping unit further comprises a first bridge arm and a second bridge arm which are connected with each other in parallel;

the first bridge arm comprises a first upper bridge arm and a first lower bridge arm which are connected with each other in series, and the second bridge arm comprises a second upper bridge arm and a second lower bridge arm which are connected with each other in series;

the first upper bridge arm and the second upper bridge arm are both connected with the positive electrode of the DC power supply, and the first lower bridge arm and the second bridge arm are both connected with the negative electrode of the DC power supply;

the first upper bridge arm, the first lower bridge arm, the second upper bridge arm and the second lower bridge arm each comprise at least one power switch tube, at least one diode connected with the power switch tube in parallel reversely, and the switch control end;

each power switch tube comprises a control electrode;

the switch control end is formed on the basis of the control electrode;

the switch control end in the first upper bridge arm, as a first upper bridge arm switch control end, the switch control end in the first lower bridge arm, as a first lower bridge arm switch control end, the switch control end in the second upper bridge arm, as a second upper bridge arm switch control end, and the switch control end in the second lower bridge arm, as a second lower bridge arm switch control end, are used for correspondingly receiving four switch control signals;

the first power output end is arranged between the first upper bridge arm and the first lower bridge arm, and the second power output end is arranged between the second upper bridge arm and the second lower bridge arm.

11. The series wound DC motor driving device according to claim 10, characterized in that:

wherein, in each chopping unit, the two switch control signal corresponding to the first upper bridge arm switch control end and the second lower bridge arm switch control end are set as reference switch control signals, and the phases of the reference switch control signals are set according to the preset phases corresponding to the unit control signals; the two switch control signal corresponding to the first lower bridge arm switch control end and the second upper bridge arm switch control end are set oppositely to the reference switch control signals;

the preset phase stagger rules refer to that the m phases corresponding to the m unit control signals are used as m preset phases staggered in sequence for 1/m of the switching period; or the m is an even integer, and the preset phase stagger rules refer to that the m phases corresponding to the m unit control signals are used as m preset phases staggered in sequence for 2/m of the switching period.

12. The series wound DC motor driving device according to claim 1, characterized in that:

wherein the m excitation winding units correspond to m pairs of main magnetic poles separately;

the insulated conductor strips in each excitation winding unit are formed on a pair of corresponding main magnetic poles.

13. The series wound DC motor driving device according to claim 12, characterized in that:

wherein the numbers of turns of the excitation coils on each main magnetic pole are the same;

each pair of main magnetic poles corresponds to the spatial position of the corresponding electrical brushes;

the connection relation between the two excitation coils is series connection or parallel connection;

the connection relation between the two excitation coils in each excitation winding unit is the same.

14. The series wound DC motor driving device according to claim 1, characterized in that:

wherein the insulated conductor strips in each excitation winding unit are formed on m pairs of main magnetic poles.

15. The series wound DC motor driving device according to claim 14, characterized in that:

wherein the winding directions and numbers of turns of the excitation coils on each main magnetic pole are the same;

in each excitation winding unit, the connection relation among 2m excitation coils is any one of series connection, parallel connection and series-parallel connection;

the connection relations among 2m excitation coils in each excitation winding unit are the same.

16. The series wound DC motor driving device according to claim 1, characterized in that:

wherein the preset connecting mode is any one of simplex lap, multiplex lap and multiplex wave.

17. Electrical equipment, characterized in that it comprises:

the series wound DC motor driving device, wherein the series wound DC motor driving device is the series wound DC motor driving device according to claim 16.

18. The electrical equipment according to claim 17, characterized in that:

wherein the electrical equipment is any one of a rolling mill, an electric locomotive, a machine main shaft transmission system and a ship.

19. Electrical equipment, characterized in that it comprises:

the series wound DC motor driving device, wherein the series wound DC motor driving device is the series wound DC motor driving device according to claim 1.

20. The electrical equipment according to claim 19, characterized in that:

wherein the electrical equipment is any one of a rolling mill, an electric locomotive, a machine main shaft transmission system and a ship.

* * * * *